No. 708,523. Patented Sept. 9, 1902.
F. BURGER.
SWIVEL TRUCK FOR VEHICLES.
(Application filed Feb. 20, 1901.)
(No Model.)
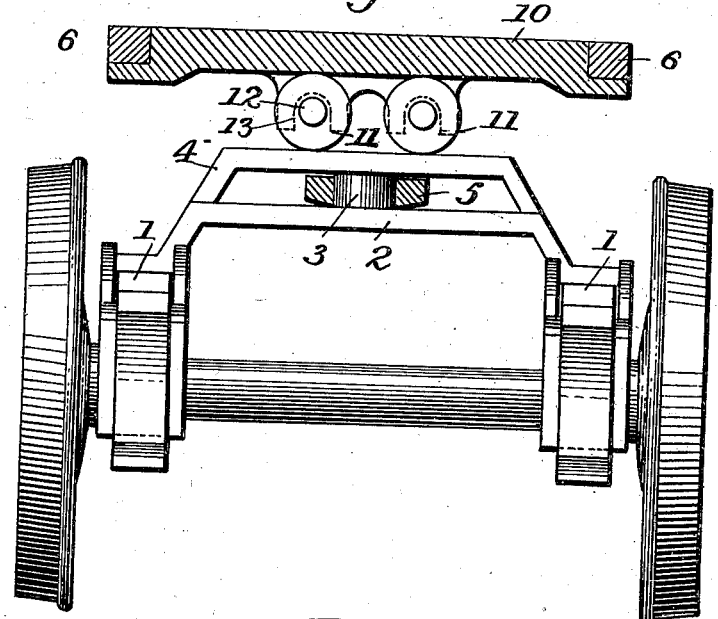
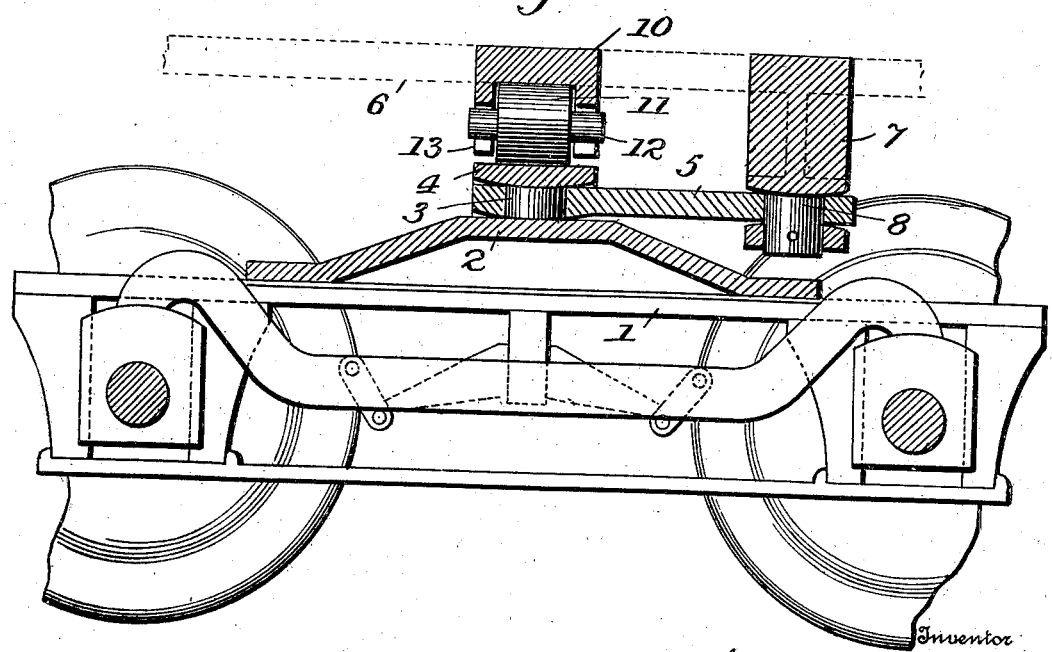

UNITED STATES PATENT OFFICE.

FRANZ BURGER, OF FORT WAYNE, INDIANA, ASSIGNOR OF THREE-FOURTHS TO HENRY M. WILLIAMS, OF FORT WAYNE, INDIANA.

SWIVEL-TRUCK FOR VEHICLES.

SPECIFICATION forming part of Letters Patent No. 708,523, dated September 9, 1902.

Application filed February 20, 1901. Serial No. 48,163. (No model.)

*To all whom it may concern:*

Be it known that I, FRANZ BURGER, a citizen of the United States, residing at Fort Wayne, in the county of Allen and State of Indiana, have invented certain new and useful Improvements in Swivel-Trucks for Vehicles, of which the following is a specification.

My invention relates to swivel-trucks for vehicles, and it has for its object to improve and simplify the construction of such trucks, and it consists in a truck embodying the general features of construction and arrangement of parts having the general mode of operation substantially as hereinafter more particularly set forth.

Referring to the accompanying drawings, Figure 1 is a transverse section of sufficient of a truck and vehicle-body to show the principles of my invention, and Fig. 2 is a longitudinal sectional view of the same.

While my invention is adapted for different kinds of vehicles, it is more particularly applicable to locomotive-vehicles—such, for instance, as street-cars or locomotive-engines—and I will describe the general principles of the invention with the understanding that it can be applied and used wherever it is applicable.

In the construction of the ordinary locomotive-engine, which is provided with driving-wheels which are connected in rigid relations with the frame of the engine, it is desirable to provide a bogie or other truck which shall be so arranged that in passing over a curved track the wheels of the locomotive will readily follow the track without tending to cramp the parts of the locomotive—as, for instance, the suspension-links. So, too, where the vehicle or locomotive has two trucks, one at each end, either with or without intermediate driving-wheels, it is desirable to provide the trucks so that they will turn or swivel freely when passing curves, and my invention is applicable to these and other purposes.

Referring to the accompanying drawings, 1 represents the frame of any ordinary truck, supported on the wheels thereof, and connected to this frame is a bolster or arch 2, it being shown in the present instance as supporting a bolt 3, arranged at or about the center of the arch. Arranged above this arch and extending transversely of the frame of the truck is a girder 4, which is shown as fastened to each side of the arch 2, and the inner surface of the girder rests on the bolt 3.

Connected to the bolt 3 is a connecting-bar 5, shown in the form of an I-bar surrounding the bolt 3 and at its other end connected to a pin 8, which is rigidly mounted upon a cross girder or support 7, secured to the frame 6 of the locomotive. Also connected to the frame 6 is a cross-bar 10, which is arranged over the girder 4 and is provided with anti-friction devices, shown in the form of rollers 11, having axles 12 supported in the bearings 13 on the cross-bar. There may be one or more of these antifriction devices, two being shown in the present instance, and these serve to support the weight of the frame 6 and the devices carried thereby and have their bearings on the girder 4 supported on the truck, while the connecting-bar 5 serves as a draft-rod for the truck. With this arrangement it will be seen that the truck is moved through the medium of the connecting-bar 5, supported on a rigid connection on the frame of the locomotive, while the weight of the frame supported by the cross-bar 10 on the girder 4 through the medium of the rollers allows the truck to swing to the right or the left and take the proper position with relation to the curves of the track or otherwise, and the truck can move freely to accommodate itself to any particular curve without undue straining or cramping. The truck, therefore, has one connection with the frame which causes it to travel with the frame and another connection by means of which the frame is supported on the truck, and the latter has a rolling connection permitting free sidewise relative motion between the truck and frame.

What I claim is—

The combination with a frame and truck, of a bolster supported on the truck, a bolt on the bolster, a girder supported above the bolt, a connecting-bar between the bolt and frame, a cross-bar connected to the frame, and friction-rollers between the cross-bar and girder, substantially as described.

In testimony whereof I have signed my name to this specification in the presence of two subscribing witnesses.

FRANZ BURGER.

Witnesses:
GEO. D. CRANE,
FRED W. BURGER.